United States Patent [19]

Murakami

[11] Patent Number: 5,518,196
[45] Date of Patent: May 21, 1996

[54] TAPE CASSETTE HAVING DIFFERENT DIAMETER TAPE REELS

[76] Inventor: Miki Murakami, 9-4, Nishinogawa 1-Chome, Tokyo, Japan

[21] Appl. No.: 313,568

[22] Filed: Sep. 26, 1994

[30] Foreign Application Priority Data

Sep. 28, 1993 [JP] Japan ................................. 5-240228

[51] Int. Cl.⁶ .............................................. G11B 23/087
[52] U.S. Cl. ........................................... 242/345; 360/132
[58] Field of Search .................................. 242/345, 341, 242/345.1; 360/132

[56] References Cited

U.S. PATENT DOCUMENTS

| | | | |
|---|---|---|---|
| 4,432,510 | 2/1984 | Ogata et al. | 242/345 X |
| 5,107,376 | 4/1992 | Murakami | 360/22 |

Primary Examiner—John Q. Nguyen
Attorney, Agent, or Firm—Birch, Stewart, Kolasch & Birch

[57] ABSTRACT

A cassette tape is constructed so that a radius of one reel side in a condition where to a middle point of a magnetic tape wound on a reel with a same radius k is a radius of a large-diameter reel, and the radius k is a radius of a small-diameter reel. With the cassette tape of the above construction, information corresponding to each other recorded on one track and the other track parallel to each other of a magnetic recording medium can be easily dubbed without deteriorating the interrelationship of information between both tracks.

3 Claims, 6 Drawing Sheets

TAPE CASSETTE HAVING DIFFERENT DIAMETER TAPE REELS

FIELD OF THE INVENTION

This invention relates to a magnetic recording medium, which can be used in preparation of a mutually and repeatedly reproducible information recording medium which allows first information and second information corresponding to each other, such as an English sentence and a Japanese sentence as its translation, to be reproduced easily and repeatedly.

BACKGROUND OF THE INVENTION

Figure 3:
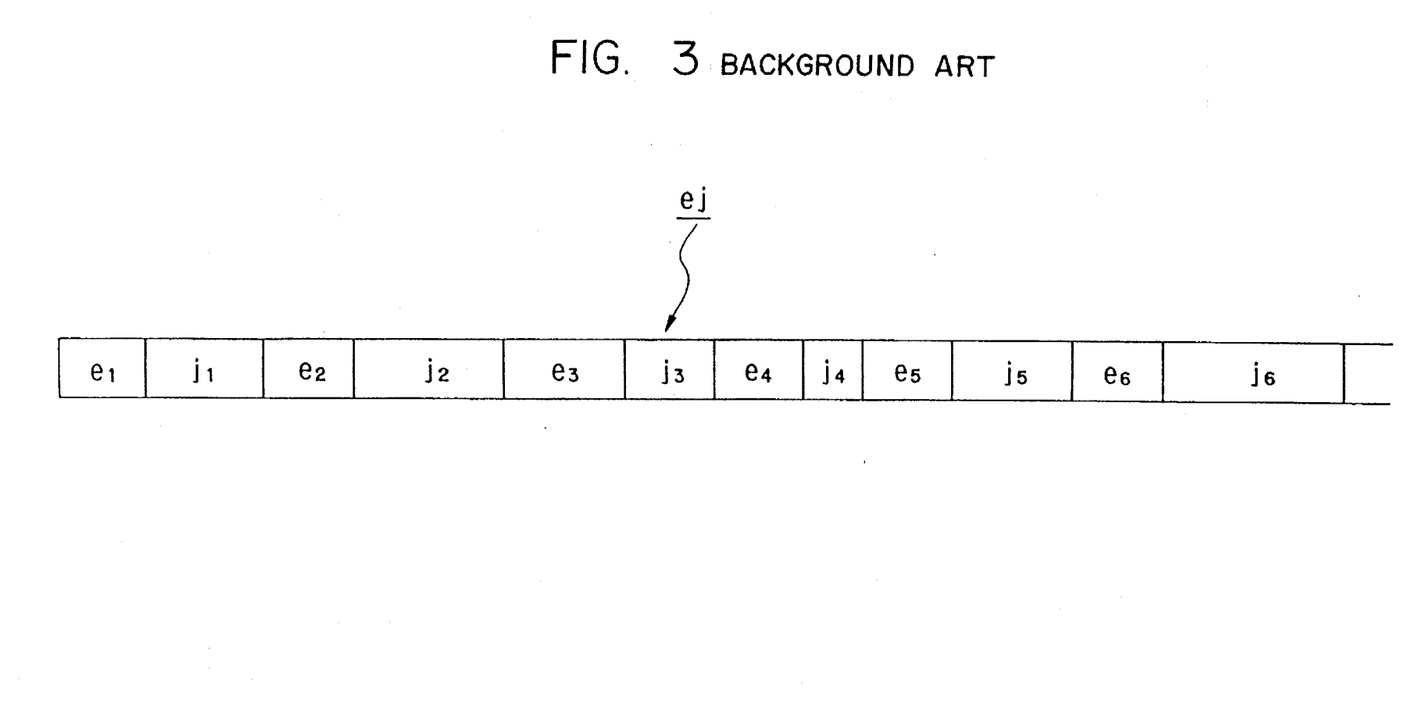
FIG. 3 is a schematic view showing a recording surface of a prior art cassette tape.

A method for learning English conversation by listening to a cassette tape is widely used in recent days with popularization of cassette tape recorders as a consumer product. In this case, the recording surface of the cassette tape is configured, for example, as shown in FIG. 3. On the recording surface of a cassette tape ej, English sound signals (hereinafter simply referred to as "English") $e_1$–$e_6$ and Japanese sound signals (hereinafter simply referred to as "Japanese") $j_1$–$j_6$, which are a Japanese translation corresponding to the English, are alternately formed on a single track.

When the above-described cassette tape ej is reproduced to learn English conversation, there is a case where the same portion of English $e_1$–$e_6$ and the corresponding part of Japanese $j_1$–$j_6$ are to be heard repeatedly. For example, when the English $e_3$ and the Japanese $j_3$ are to be heard repeatedly, at the time the Japanese $j_3$ has been heard, the cassette tape ej must be rewound to the head of the English $e_3$, and then the English $e_3$ and the Japanese $j_3$ must be heard again. Therefore, a tedious manipulation of the cassette tape recorder is required in association with repeated listening.

In view of the above prior art defects, the inventor has proposed a mutually and repeatedly reproducible information recording medium which enables easy repeated reproduction of a necessary part of information comprising a combination of a plurality of first information and second information corresponding to each other, such as English and Japanese as its translation, as Japanese Patent Application 62-8093 (U.S. Pat. No. 5,107,376).

The above information recording medium will be described.

Figure 4:
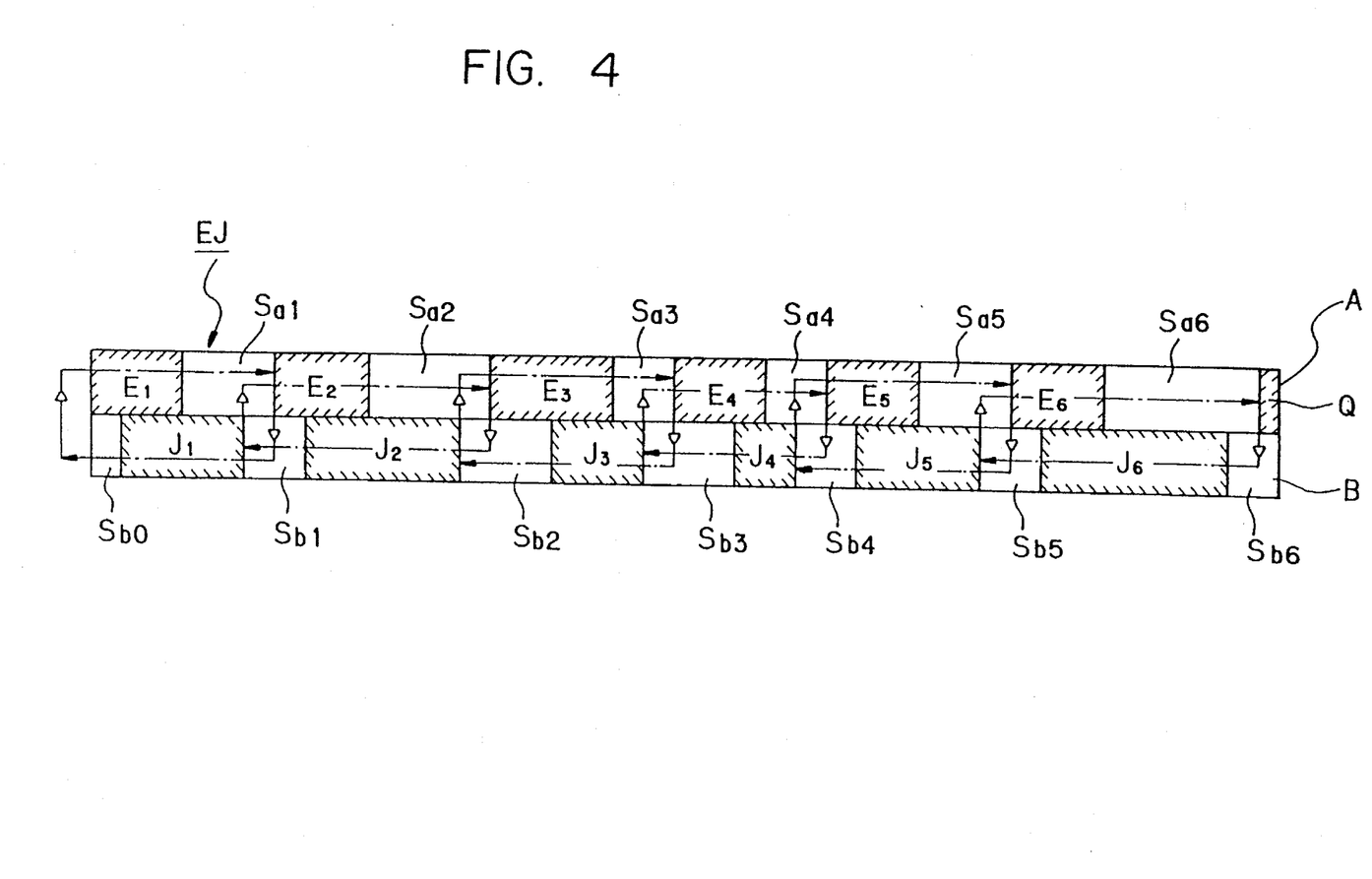
FIG. 4 is a schematic view showing a recording surface of a cassette tape recorded with information corresponding to each other on one track and the other track.

FIG. 4 is a schematic view showing the recording surface of a cassette tape as an example of the information recording medium. In the Figure, EJ denotes a cassette tape, A denotes an A track, B denotes a B track, $E_1$–$E_6$ denote English, and $J_1$–$J_6$ denote Japanese. In this case, the Japanese $J_1$ is a translation corresponding to the English $E_1$. Similarly, the Japanese $J_2$–$J_6$ are individually translations of the English $E_2$–$E_6$ having the corresponding suffix. The English $E_1$–$E_6$ are normally reproduced when the cassette tape EJ is moved in the left direction in the Figure with respect to the magnetic head, and the Japanese $J_1$–$J_6$ are normally reproduced when the cassette tape EJ is moved in the right direction in the Figure with respect to the magnetic head. That is, the English $E_1$–$E_6$ are recorded from the left end of the Figure towards the right side, and the Japanese $J_1$–$J_6$ are recorded in the reverse direction. In the Figure, Q indicates a Q mark which is a reference point for finding the head of the Japanese $J_6$.

As describe above, in this example, the English $E_1$–$E_6$ as the first information and the Japanese $J_1$–$J_6$ which are translations individually corresponding to the English $E_1$–$E_6$ are recorded on a B track A and a B track B, respectively, of the cassette tape as a magnetic recording medium.

The mark Q of the English $E_1$–$E_6$ and the Japanese $J_1$–$J_6$ are blocks partitioned off individually at an appropriate time, such as the end of a sentence. Portions of track B at the lower part of the Figure and track A at the upper part of the Figure, which are the start points of the individual blocks, are always space sections $S_{a1}$–$S_{a6}$ and $S_{b0}$–$S_{b6}$ where no information is recorded. That is, track B and track A corresponding to the start point positions of the English $E_1$–$E_6$ and the Japanese $J_1$–$J_6$ and the mark Q are always space sections $S_{b0}$–$S_{b6}$ and $S_{a1}$–$S_{a6}$, and these space sections $S_{a1}$–$S_{a6}$ and $S_{b0}$–$S_{b6}$ are, with respect to the tape running direction of the cassette tape EJ at reproduction of the first and second information, spaces immediately after the blocks where mutually corresponding information is recorded. That is, for the English $E_3$ and the Japanese $J_3$, for example, the space section $S_{a3}$ corresponding to the start point position of the Japanese $J_3$ is the space section $S_{a3}$ immediately after the English $E_3$ with respect to the running direction of the tape. Further, the space section $S_{b2}$ corresponding to the start point position of the English $E_3$ is the space section $S_{b2}$ immediately after the Japanese $J_3$ with respect to the running direction.

Further, in this example, track B and track A corresponding to the end point positions of the English $E_1$–$E_6$ and the Japanese $J_1$–$J_6$ are always halfway $E_1$–$E_6$ and the Japanese $J_1$–$J_6$ corresponding to each other.

Here, the start point means the position at which each information segment begins, that is, the left end of each block for the English $E_1$–$E_6$ and the mark Q, and the right end of each block for the Japanese $J_1$–$J_6$. Further, the end point of a block means the position at which each information segment ends.

With such a cassette tape EJ, the English $E_1$–$E_6$ and the Japanese $J_1$–$J_6$ can be repeatedly reproduced by the following operation on a cassette tape recorder having an auto-reverse function.

For example, after the English $E_2$ is heard and then its translation is to be heard, the English $E_2$ is reproduced by reproduction of track A, the reverse key is operated to select reproduction of track B when the head of the English $E_3$ is found. As a result, the space section $S_{b2}$ is first reproduced, and then the Japanese $J_2$ is reproduced. After that, when reproduction of the Japanese $J_2$ is complete and at the time the head of the Japanese $J_3$ is found, the reverse key is operated to select reproduction of track A. This operation can be repeated to repeatedly hear the English $E_2$ and the Japanese $J_2$ as its translation for desired times. The English $E_2$–$E_5$ and the Japanese $J_2$–$J_5$ as individual corresponding translations can be heard mutually using the same procedure as for the English $E_2$ and the Japanese $J_2$. When the English $E_1$ is heard and the Japanese $J_1$ is heard, and then reproduction is to be reverted back to track A, the reverse key may be operated at the head of the margin section of the cassette tape EJ. Further, the English $E_6$ is heard and then the Japanese $J_6$ is to be heard, reproduction of the English $E_6$ is finished, and the reverse key may be operated when the head of mark Q is found. That is, by operating the cassette tape recorder so that the reproduction route is formed as indicated by the dot-bar line arrow, the English $E_1$–$E_6$ and the Japanese $J_1$–$J_6$ can be heard corresponding to each other. The symbol Δ indicates a position at which the reverse key is operated.

The above cassette tape EJ is very useful in English education using the recorded information, and can be used in the following way. That is, using the cassette tape EJ as a master source, the English $E_1$-$E_6$ on the side A are first reproduced and broadcast in this order, and then the cassette tape EJ is reversed to reproduce and broadcast the Japanese $J_6$-$J_1$ in this order. At this moment, numbers of broadcast listeners record the broadcasting of the side A on one track of a cassette tape by their own cassette tape recorder, and then the cassette tape is reversed to record the broadcasting of the side B on the other track, thus enabling dubbing of a number of tapes.

However, when the above dubbing system is constructed with a reception system using the state of the art cassette tape recorder, it is found that there is a major problem that disturbs the construction. The problem will be described with reference to FIG. 5.

Figure 5A:
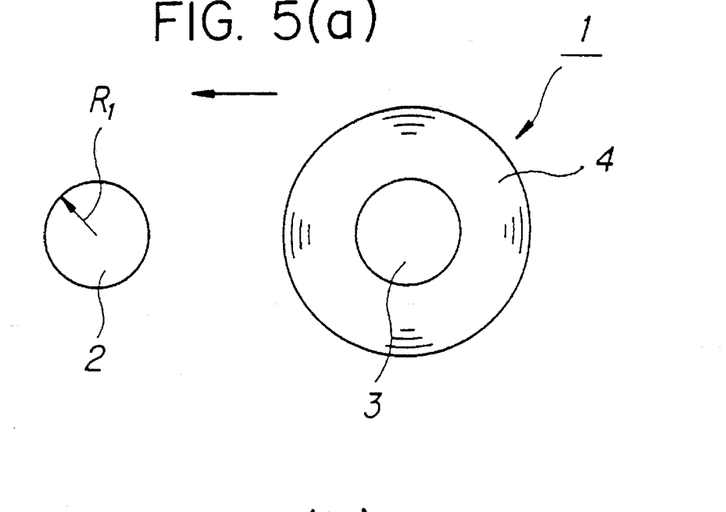
FIGS. 5(a)–(c) are schematic views showing the cassette tape when dubbing the information shown in FIG. 4.
Figure 5B:
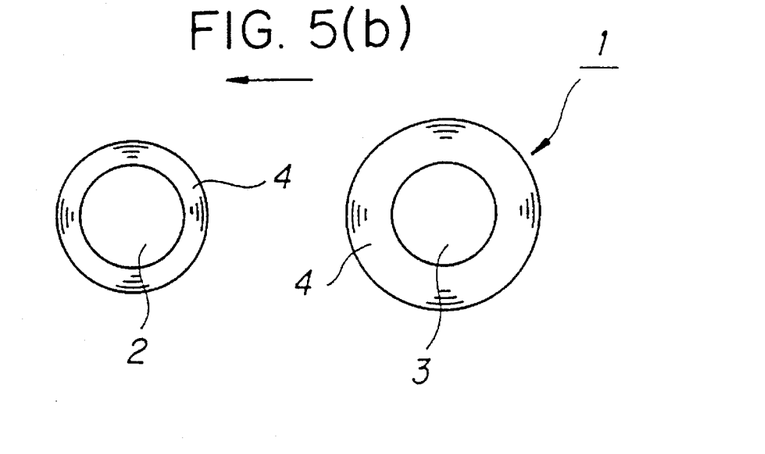
Figure 5C:
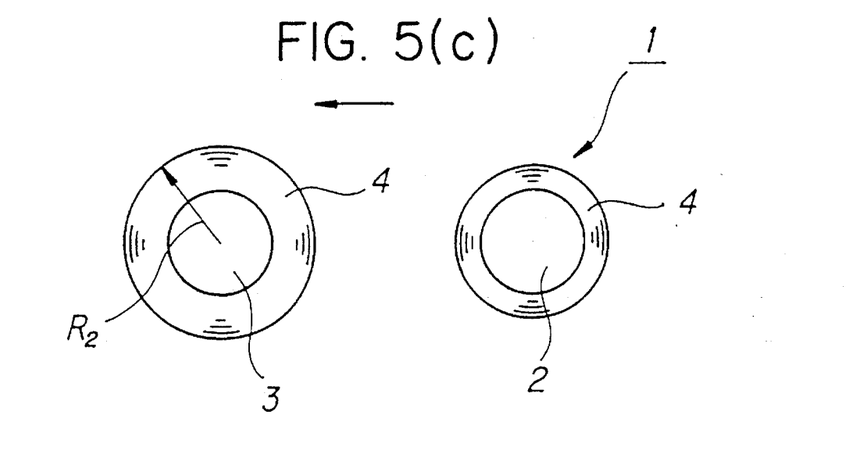

In FIG. 5, the reference numeral 1 indicates a cassette tape, 2 indicates its one reel, 3 indicates the other reel, 4 indicates a magnetic tape, and the arrow indicates a running direction of the magnetic tape 4. With the cassette tape 1, while the magnetic tape 4 wound on the one reel 2 is wound on the other reel 3, or while the magnetic tape 4 wound on the other reel 3 is wound on the one reel 2, the information is recorded or reproduced. The reels 2 and 3 have the same diameters.

Now, as shown in FIG. 5(a), the English $E_1$-$E_6$ on the side A of the cassette tape EJ as a master source are recorded in this order from one end of the magnetic tape 4 while rewinding the magnetic tape 4 with the reel 2. The condition when recording of the side A is complete is assumed as shown in FIG. 5(b). The Japanese $J_6$-$J_1$ on the side B are recorded in this order from the condition where the cassette tape i in the condition as shown in FIG. 5(b) is reversed.

Therefore, the recording condition of the side A differs from the recording condition of the side B. More specifically, recording of the side A begins from the condition as shown in FIG. 5(a), whereas recording of the side B begins from the condition as shown in FIG. 5(b). That is, radii $R_1$ and $R_2$ at the winding side differ from each other at the beginning of recording. As a result, there is a difference between the running distance of the magnetic tape for the time required for side A recording and the running distance of the magnetic tape 4 for the same period of time for side B recording, and interrelationship of information is deteriorated at the dubbing side between the side A and side B of the cassette tape EJ as the master source.

Although the running speed of the magnetic tape 4 per unit of time is controlled to a constant value under any condition by the capstan roll of the tape recorder, an error associated with a difference in radius between the winding side and the feed side cannot be avoided, and the error is accumulated to constitute a vital defect in dubbing the corresponding information on the side A and side B as shown in FIG. 4.

When the tape recorders at the transmission side and the reception side are possible to make reproduction and recording while running the magnetic tape in a direction reverse to the normal operation (hereinafter referred to as "reverse reproduction" or "reverse recording"), the side A is broadcast with the transmission side tape recorder, the information is recorded with the reception side tape recorder. When both the transmission side and reception side tape recorders are reversed to find the head of the side A, the information is broadcast while reverse reproducing the side B at the transmission side, and the information of the side B is reverse recorded at the reception side, since the recording conditions of the side A and side B are unchanged, dubbing is achieved without deteriorating the interrelationship of information between the sides A and B. However, such tape recorders that can make reverse reproduction and reverse recording are available for professional and expert uses, but unavailable for general purpose.

Therefore, a primary object of the present invention is to provide a magnetic recording medium which allows simple dubbing of information recorded on one and the other tracks parallel to each other of the magnetic recording medium, such as information shown in FIG. 4, without destroying the interrelationship between the information.

The present invention which attains the above object is based on findings obtained by the inventors in the study for finding the cause of the above errors between side A recording and side B recording. That is, when an information is recorded on one side (side A) of the cassette tape 1, the cassette tape is reversed at the end of recording, and an information is recorded on the other side (side B), recording is possible maintaining the same conditions of the side A and the side B when the cassette tape 1 is recorded from the head of the side A to the end, and then the cassette tape 1 is reversed and the side B is recorded.

However, in this case, since there are deviations in the total length of the individual cassette tapes at the reception side and in characteristics of the individual cassette recorders used for recording, it is impossible to maintain the same condition over the entire cassette tape 1 at the reception side as that of the transmission side, even though the side A of the transmission side cassette tape EJ is broadcast to the end and, in this condition, the cassette tape EJ is reversed and the side B is broadcast.

Figure 6A:
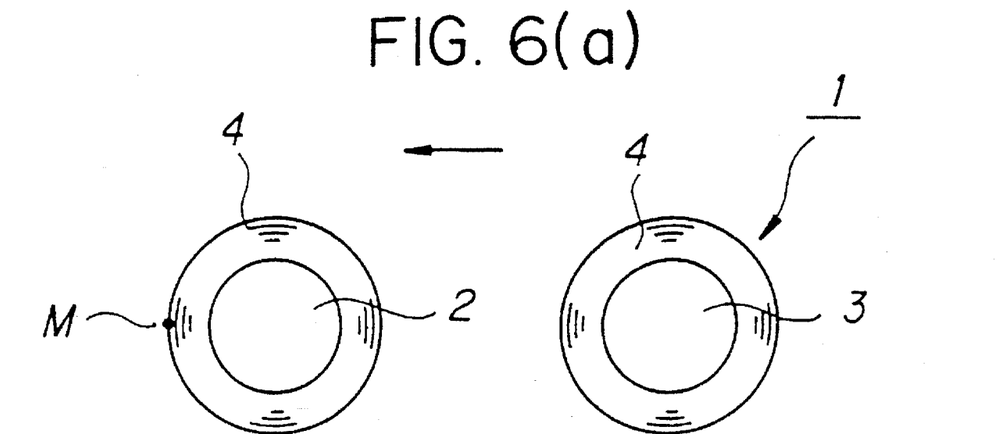
FIGS. 6(a)–(c) are schematic views showing the cassette tape when dubbing utilizing the middle point M.
Figure 6B:
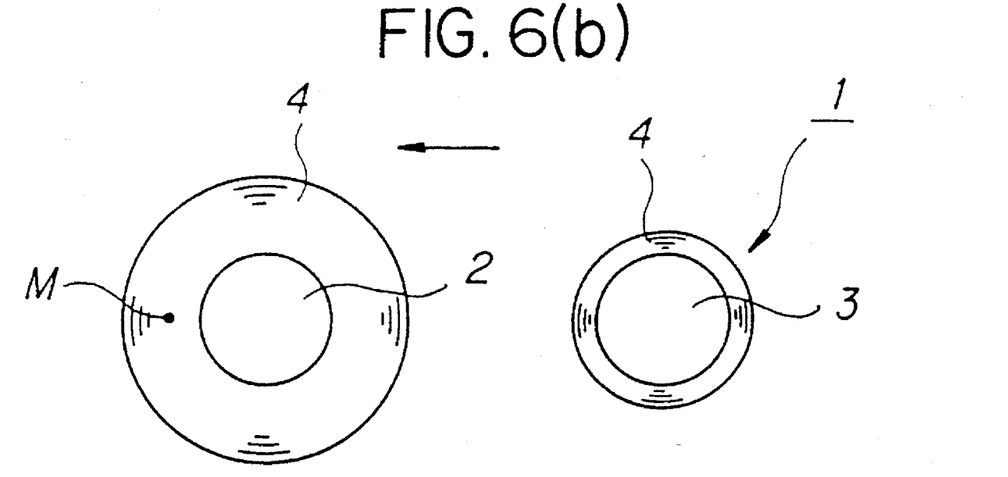
Figure 6C:
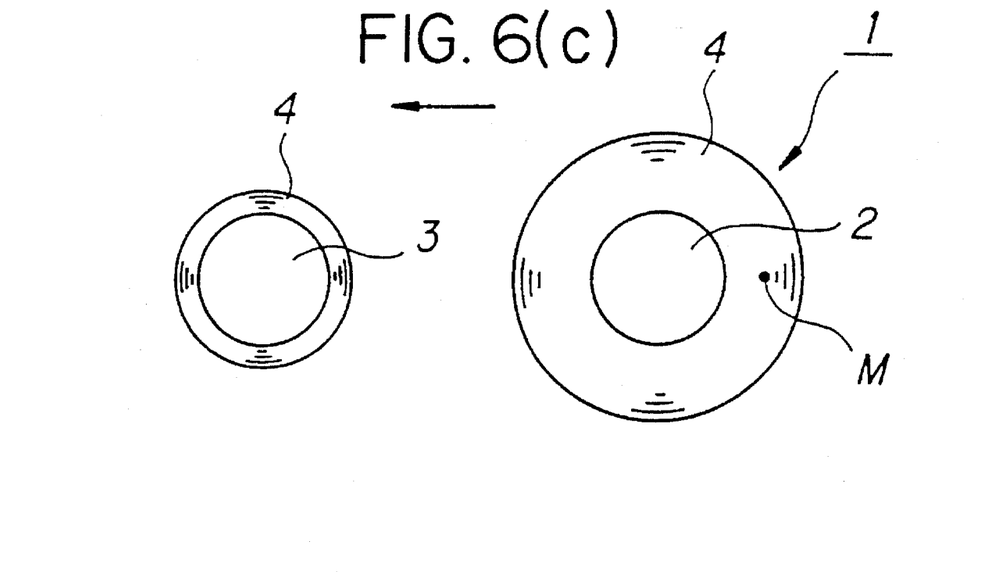

Then, studies have been conducted to find a condition where the recording condition is the same for side A recording and side B recording and, as a result, utilization of the middle point of the magnetic tape 4 is found. That is, since, at the middle point of the magnetic tape 4, the radius of the winding side is equal to the radius of the feed side, and condition of side A recording is the same as that of side B recording at the middle point, an error in recording condition between side A recording and side B recording should be minimized by utilizing the middle point. It has been found that, as shown in FIG. 6(a), when the side A is recorded from a middle point M of the magnetic tape 4, the cassette tape 1 in the condition as shown in FIG. 6(b) is reversed and the side B is recorded as shown in FIG. 6(c), the corresponding information of the side A and side B of the cassette tape EJ can be dubbed without deteriorating the interrelationship between both.

SUMMARY OF THE INVENTION

In accordance with the present invention, which is based on the above findings, in a magnetic recording medium like a cassette tape for recording and reproducing information while winding a magnetic tape wound on one reel onto the other reel, or winding the magnetic tape wound on the other reel onto the one reel, characterized in that the one reel is formed to a small diameter, the other reel is formed to a large diameter, where a radius of the large-diameter reel is r, and the r satisfies the relation:

$$r = \sqrt{\frac{R^2 + k^2}{2}}$$

wherein R is a radius of the large-diameter reel which is a winding thickness when the entire magnetic tape is wound on the large-diameter reel added to the radius of the large-diameter reel, and k is a radius of the small-diameter reel.

With the present invention of the above arrangement, in the condition when the entire magnetic tape is first wound on the small-diameter reel, the winding side and the feed side are the same in diameter. From this condition, a predetermined information is recorded on one side using the large-diameter reel as the winding side and, after completion of the information recording, a predetermined information is recorded on the other side using the small-diameter reel as the winding side.

With the present invention, recording conditions of both sides can be made as equivalent as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

An embodiment of the present invention will be described in detail with reference to the drawings.

Figure 1A:
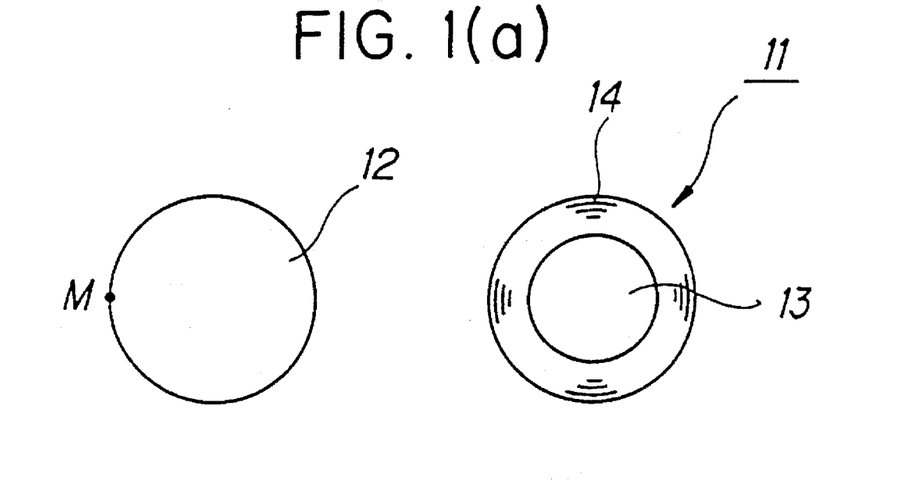
FIGS. 1(a) and (b) are schematic views showing an embodiment of the cassette tape according to the present invention.
Figure 1B:
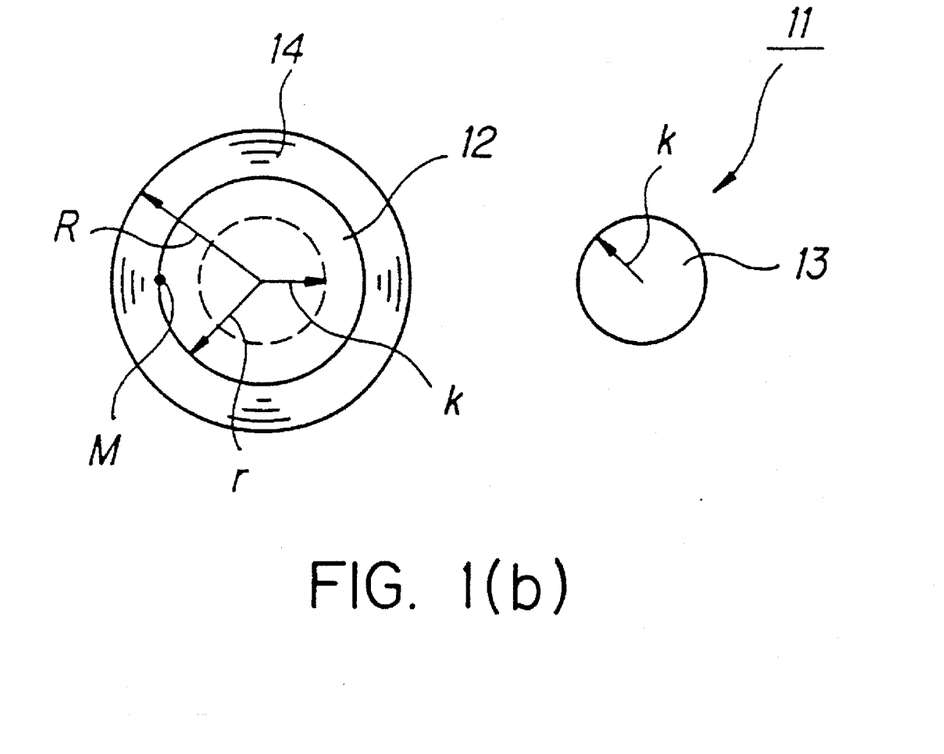

FIGS. 1(a) and (b) are schematic views showing a cassette tape 11 as an embodiment of the present invention. As shown in the Figures, the cassette tape 11 of the present embodiment has a large-diameter reel 12 and a small-diameter reel 13, one of the reels 12 and 13 is the winding side of a magnetic tape 14, one track of the magnetic tape 14 and the other track parallel to the one track are recorded with information, and the recorded information is reproduced.

FIG. 1(a) shows a condition where the entire magnetic tape 14 is wound on the small-diameter reel 18.

FIG. 1(b) shows a condition where the entire magnetic tape 14 is wound on the large-diameter reel 12.

Further, in this case, radius r of the large-diameter reel 12 satisfies the following equation.

$$r = \sqrt{\frac{R^2 + k^2}{2}}$$

wherein R is a radius of the large-diameter reel 12 which is a winding thickness when the entire magnetic tape 14 is wound on the large-diameter reel 12 added to the radius of the large-diameter reel 12, and k is a radius of the small-diameter reel 13.

In the cassette tape 11 of the above construction, the small-diameter reel 13 side radius is equal to the large-diameter reel 12 side radius. That is, the condition shown in FIG. 1(a) is the same as the condition shown in FIG. 6(a). Therefore, the middle point M shown in FIG. 6(a) is achieved as an end at the large-diameter reel 12 side of the magnetic tape 14 in FIG. 1(a).

An area S of a difference between the area of the large-diameter reel 12 and the small-diameter reel 13 is given as $S = r^2\pi - k^2\pi$ and, at the same time when the relation shown in FIG. 6(a) is made, the area S is given as $S = (R^2\pi - k^2\pi)/2$. Therefore, since a relation of $(r^2\pi - k^2\pi) = (R^2\pi - k^2\pi)/2$ is formed, the radius r is given by the above equation.

Figure 2A:
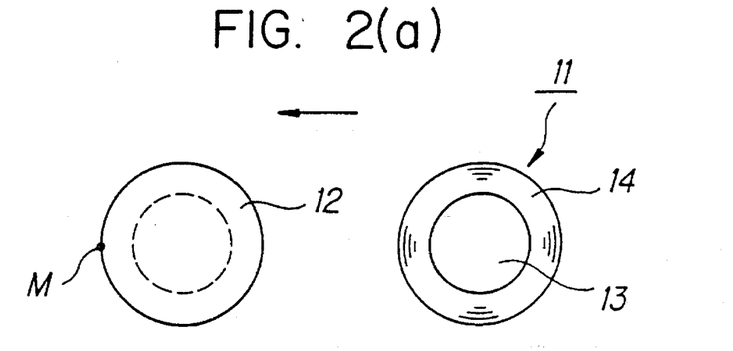
FIGS. 2(a)–(d) are schematic views showing condition in recording using the cassette tape of the embodiment.
Figure 2B:
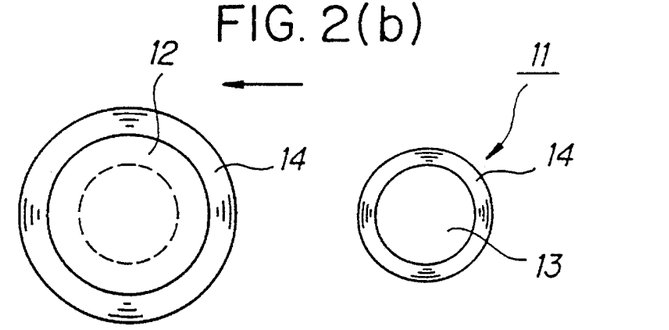
Figure 2C:
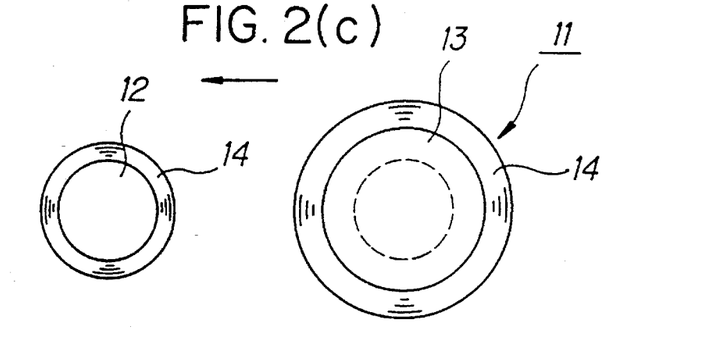
Figure 2D:
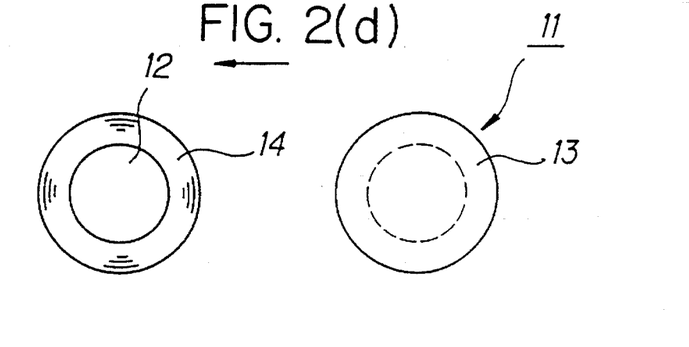

With the present embodiment, when dubbing information of the cassette tape EJ as shown in FIG. 4, first from the condition as shown in FIG. 2(a), side A is recorded while winding the magnetic tape 14 on the reel 12 (while running in the direction of the arrow). That is, recording is made from the middle point M. When recording of the side A is complete with the condition shown in FIG. 2(b), the cassette tape 11 is reversed, the side B is recorded from the condition as shown in FIG. 2(c) to complete recording of the side B with the same condition shown in FIG. 2(d), same as in FIG. 2(a). Since, recording of the side B at this moment gradually becomes close to the same condition as side A recording as recording advances from the start point to the end point, in effect an equivalent condition to recording of the side A and side B under the same condition can be formed.

It is not easy to find the middle point M of the commercial cassette tape 1. That is, a general-purpose tape recorder generally has a counter as a measure of running amount of the magnetic tape, but the position of the middle point indicated by the counter differs from the point of the middle point M of the magnetic tape 14. Therefore, it is generally impossible to specify the middle point from the indication of the counter.

Further, while the present embodiment uses the large-diameter reel 12 and the small-diameter reel 13, even with the commercial cassette tape 1 in which both reels 2 and 3 have the same diameters, a cassette tape substantially equivalent to the present embodiment shown in FIG. 1 can be formed when, alternatively, the magnetic tape 4 is wound on one reel 2 or 3 so that the condition of the above equation is satisfied, at the point, the magnetic tape 4 is fixed to the one reel 2 or 3, and the reel 2 or 3 to which the magnetic tape 4 is fixed is the large-diameter reel side.

Further, while the above embodiment shows a case with an audio cassette tape, it is needless to say that the cassette tape may be a video tape, an open-reel tape, or the like. The video tape according to the present invention is particularly useful when it is used as a master tape. Further, in the master tape shown in FIG. 4, the left end and the right end in the Figure must be both ends of the tape, or the master tape must be one which is recorded on the tape of the above embodiment. This is essential for equivalent reproduction conditions of both sides A and B.

As described above in detail with reference to the embodiment, with the present invention, dubbing is achieved in good condition without deteriorating the interrelationship of information corresponding to each other between one track and the other track.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape cassette for use with a recording and reproducing apparatus, said tape cassette including a first small-diameter reel, and a second larger-diameter reel, wherein a radius of the larger-diameter reel is r, and the r satisfies the relation:

$$r = \sqrt{\frac{R^2 + k^2}{2}}$$

where R is a total radius of the larger-diameter reel plus a tape winding thickness when an entire magnetic tape is wound on the larger-diameter reel, and k is a radius of the small-diameter reel.

2. The tape cassette according to claim 1, wherein the larger-diameter reel comprises magnetic tape wound on a reel having a smaller radius than the radius r.

3. The tape cassette according to claim 2, wherein said reel having a smaller radius than the radius r has a radius equal to the radius k of said small-diameter reel.

* * * * *